United States Patent [19]

Morris

[11] Patent Number: 4,592,448
[45] Date of Patent: Jun. 3, 1986

[54] OIL PAN DRAIN RECEPTACLE

[76] Inventor: Wayne Morris, 6813 Briarhill Rd., Crestwood, Ky. 40014

[21] Appl. No.: 534,745

[22] Filed: Sep. 22, 1983

[51] Int. Cl.⁴ ............................................. F01M 11/04
[52] U.S. Cl. ...................................... 184/1.5; 141/98; 141/114
[58] Field of Search ................... 184/1.5; 141/10, 114, 141/313-317, 98

[56] References Cited

U.S. PATENT DOCUMENTS

| | | | |
|---|---|---|---|
| 4,098,398 | 7/1978 | Meyers | 184/1.5 |
| 4,101,000 | 7/1978 | Scully | 184/1.5 |
| 4,283,032 | 8/1981 | Smith | 184/1.5 |

Primary Examiner—Houston S. Bell
Attorney, Agent, or Firm—Edward M. Steutermann

[57] ABSTRACT

A device to facilitate draining oil from an automotive vehicle oil pan including an elbow shaped conduit having a sleeve member located in the outer wall of the conduit member and adapted to receive a shaft where the shaft is longitudinally movable in the sleeve member toward and away from a drain plug carried by the oil pan. A first open end of the conduit member is located adjacent the plug with the plug within the periphery of the first end and the shaft member carries a socket member to remove the drain plug with the first end of the conduit located adjacent the drain pan. A second end of the conduit is adapted to receive a receptacle.

3 Claims, 4 Drawing Figures

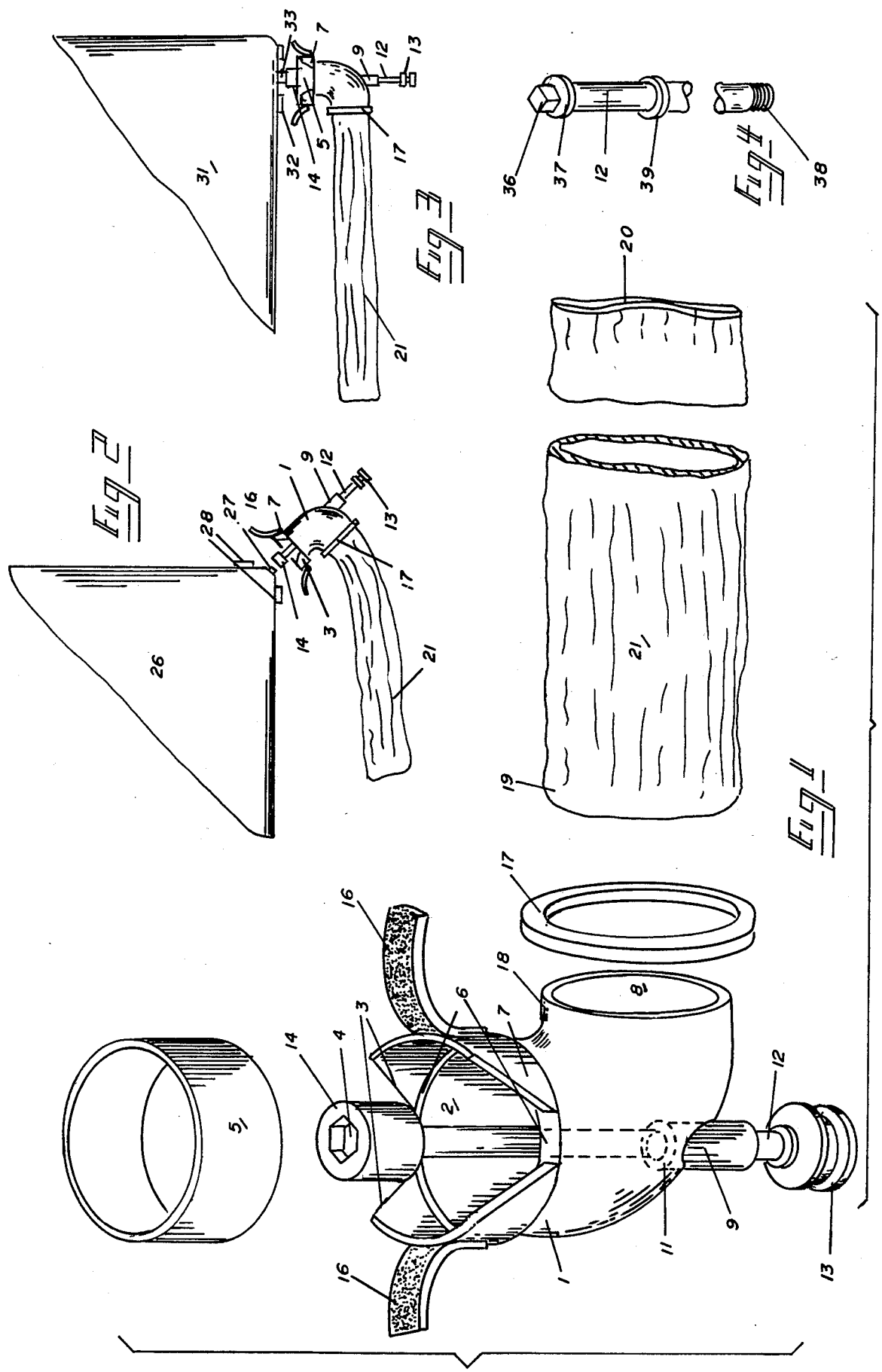

OIL PAN DRAIN RECEPTACLE

BACKGROUND OF THE INVENTION

The present invention relates generally to a device to facilitate draining lubricating oil from a crankcase pan, for example a crankcase pan of an automotive vehicle.

It is well known that many individuals prefer to change the oil in their automotive vehicles rather than seek the assistance of service station or garage facilities. One difficulty commonly encountered with changing the oil in an oil pan away from a facility such as a service station or garage is that the person changing the oil must go under the vehicle and have the facilities available to receive the oil as it drains from the crankcase. Further in many instances, removal of the crankcase plug causes oil to spurt out of the crankcase and usually to contact the person changing the oil. Finally it is necessary for the person changing the oil to remove the used oil from beneath the automotive vehicle and, when an open pan is utilized the sloshing of the oil in the pan frequently causes spillage.

Further when the oil has been removed from beneath the automotive vehicle and where it is contained in an open pan it is then necessary to pour the oil into a second receptacle for disposal.

No prior art arrangement is known for provision of a device or mechanism for facilitating the changing of oil from the crank case of an automotive vehicle which provides an arrangement to receive the oil into a receptacle which can be finally disposed of without transfer to another receptacle and which permits the removal of the drain plug and the replacement thereof without exposure of the person changing the oil to the oil drained from the crankcase.

SUMMARY OF THE INVENTION

The present invention provides a new and useful arrangement to facilitate the removal of oil from the crankcase of an automotive vehicle without the necessity for the use of a pan or other receptacle. Further, devices within the scope of the present invention are economical to fabricate and are particularly effective in preventing spillage of oil as it is removed from the crankcase.

Additionally, devices within the scope of the present invention provide a conduit and means to remove and replace the drainplug without removal of the conduit from the crankcase.

More particularly, the present invention provides a device to facilitate draining oil from an automotive vehicle oil pan including an elbow shaped conduit having a sleeve member located in the outer wall of the conduit member and adapted to receive a shaft where the shaft is longitudinally movable in the sleeve member toward and away from a drain plug carried by the oil pan when a first open end of a conduit member is located adjacent the plug with the plug within the periphery of the first end, and where the shaft member carries a socket member to remove the drain plug with the first end adjacent the drain pan and where a second end of the conduit is adapted to receive a receptacle.

While various arrangements within the scope of the present invention will be conceived by those reading the disclosure hereinafter, one example in accordance with the present invention is illustrated in the accompanying Figures for purposes of illustration and not by way of limitation.

BRIEF DESCRIPTION OF THE DRAWINGS

One example in accordance with the present invention shown in the figures:

FIG. 1 is a perspective exploded view of one example of an arrangement within the scope of the present invention; and FIG. 2 is an illustration of one means of utilizing the device shown in FIG. 1;

FIG. 3 is an illustration of another method of use of the device shown in FIG. 1; and FIG. 4 is a detailed drawing of a shaft useful in the device shown in the Figures.

DETAILED DESCRIPTION OF THE DRAWINGS

FIG. 1 is an illustration, in exploded perspective view of one arrangement within the scope of the present invention.

In FIG. 1 an elbow shaped conduit 1 is provided having openings 2 and 8 at opposite ends. A flange member 7 extends around the opening 2 in slightly offset relation therefrom to provide a lip 6. Slots 3 are cut in flange 7 as shown and described hereinafter.

A sleeve 9 is provided and extends through the wall of elbow 8 in generally aligned relation with the center of an opening 2 with a portion 11 located within the elbow as shown in dotted lines. A shaft 12 is provided to be freely and longitudinally movable in shaft 9 having a handle 13 at the end outside of elbow 1 as shown.

FIG. 4 is an illustration of one example of a shaft useful in the device shown in FIG. 1. In FIG. 4 shaft 12 is seen to have a square end 36 to receive socket 14 as shown in FIG. 1. Also an enlargement 37 can be provided to prevent withdrawal of shaft 12 from sleeve 9 when handle 13 is in place. As shown handle 13 can be attached to shaft 12 by means of threads 38 at the end of shaft 12 where the shaft is inserted through sleeve 9 through opening 2 and handle 13 threaded thereon so that shaft 12 is retained in sleeve 9 by enlargement 37 at one end and handle 13 at the other. Additionally an "O" ring seal 39 can be provided in a groove (not shown) on shaft 12 so that the "O" ring is received in sleeve 9 to prevent oil leaking out through the sleeve. Socket 14, this case a hex socket, is shown located on end 34 of shaft 9 in generally centrally located relation within opening 2. In the arrangement shown, shaft 12 can be moved longitudinally in sleeve 9 to adjust the position of socket 14.

While various modifications can be made in the arrangement shown heretofore, the arrangement shown is adapted to be received by crankcase pans having the outlet opening on a corner thereof or on a flat bottom surface thereof as described hereinafter and the notch 3 is provided to accommodate such an arrangement where a second sleeve 5 is provided to be received within sleeve 7 to permit use of the device in a crankcase where the outlet port is located onto the flat bottom.

Within the scope of the present invention means are provided to fasten the elbow to the crankcase and in the arrangement shown tabs 16 are provided which can be, for example, of Velcro ® hook and eye type fastener device, commonly known in the art.

A receptacle 21, for example a flexible bag having an inlet 19 adapted to be located over opening 8 of elbow 1 around an edge 18 is provided and an elastomeric band 17 is provided to be received over end 19 of bag 21 t secure the bag to the edge 18 of elbow 1. Bag 21 can be of any selected length and has a sealed end 20 to prevent leakage of the material which is received in opening 2 of elbow 1 and flows through the opening 8.

FIG. 2 is an illustration of the use of the device shown in FIG. 1 in assembled form on a crankcase pan 26 having an outlet plug 27 located in a corner thereof.

As shown, cooperative fastener means, for example mating velcro strips 28 are provided on the vertical and horizontal surfaces to receive the velcro strips 16 of elbow 1 to secure the device to the crankcase pan. In the arrangement shown in FIG. 2 the socket 14 is shown in position to receive plug 27. In operation elbow 1 is secured to the crankcase tabs 28 by means of velcro strips 16 of the elbow 1 with the shaft 12 in withdrawn position or alternatively after the socket 14 has been located on the plug 27. Handle 13 is then rotated in the proper direction to remove the plug 27 which is retained in the socket 14 during the draining operations. It will be appreciated that with the elbow 1 in position on the crankcase 26 the plug can be removed and the oil allowed to drain into the recepticle 21 through the elbow 1 without necessitating a manual handling of the plug. After the drainage has been completed the plug is simply returned by relocating the socket 14 in position to insert the plug 27 and the plug is retightened by turning handle 13 in the direction opposite to the original direction of rotation. In the arrangement shown in FIG. 2 the sleeve 5 is not utilized so that the notches 3 are disposed to receive the corner of the crankcase pan and allow the oil to drain. The extension 11 located within the elbow 1 prevents leakage of the oil between the sleeve 9 and the shaft 12 so that all of the oil drains into the recepticle 21.

FIG. 3 is an illustration where the device is utilized to drain the oil from the crankcase 31 having a plug 33 on a horizontal surface. Cooperative velcro strips 32 are located on the horizontal surface to receive the strips 16 of elbow 1. The socket 14 is located with respect to plug 33 as previously described with reference to remove and reinsert the plug. In this case the sleeve 5 has been located in the flange 7 so that the upper surface of sleeve 5 rests on the bottom surface of the pan to prevent leakage through the slots 3. The operation of the device as described with reference to FIG. 2 and after the oil has been completely drained into the recepticle 21 the device is simply removed by detaching the velcro strips 16 from the velcro strips 32 which then remain in place for the next oil change.

The velcro strips 32 and 28 can be of the type having a strong adhesive located on one side with the velcro material on the opposite side so that the strips are permanently attached to the crankcase pan for subsequent use.

It will be understood that the foregoing is but one example of an arrangement within the scope of the present invention and that various other arrangements also within the scope of the present invention will become obvious to those skilled in the art upon reading the disclosure set forth hereinbefore.

The invention claimed is:

1. A device for draining oil from an automotive vehicle oil pan including an elbow shaped conduit; having first and second open ends; a sleeve member located in the outer wall of the conduit member in longitudinally aligned relation with said first end; a shaft slidably received in said sleeve member and having a shaft end with shaft longitudinally movable in said sleeve member toward and away from a drain plug carried by the oil pan when said first end of said conduit is located adjacent said plug with said plug within the periphery of said first end; a socket member having a diameter larger than said sleeve diameter carried by said shaft member shaft end to remove said drain plug with the first end of said conduit adjacent said drain pan, releasable fastener means located adjacent said first end to connect said conduit to said oil pan whereby said shaft is in aligned relation with said drain plug and flexible receiver means to be releasably connected to said second end.

2. The invention of claim 1 wherein said shaft means includes a second shaft end and handle means carried by said second shaft end having a diameter greater than the diameter of said sleeve member.

3. The invention of claim 1 wherein said first shaft end is of greater diameter than said sleeve diameter.

* * * * *